April 20, 1937.  W. F. TEDHAM ET AL  2,077,442
CATHODE RAY TUBE
Filed Aug. 9, 1933
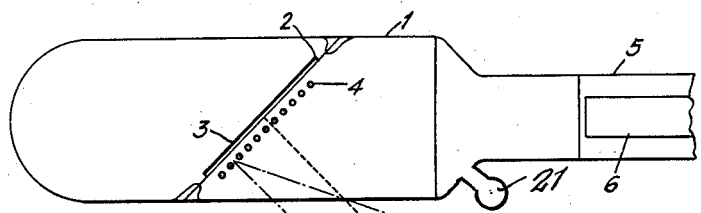
*Fig. 1a.*
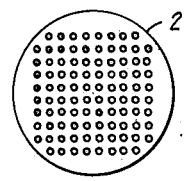
*Fig. 2*
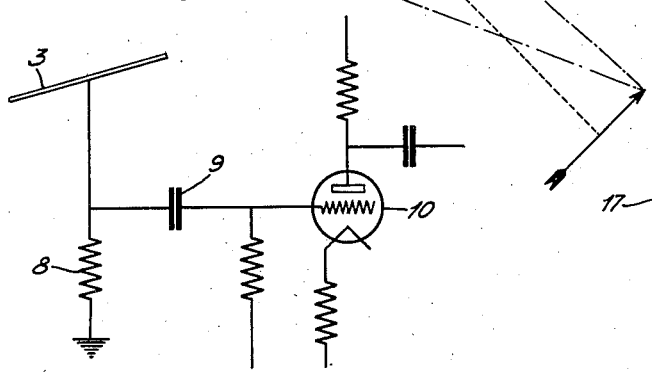
*Fig. 3*
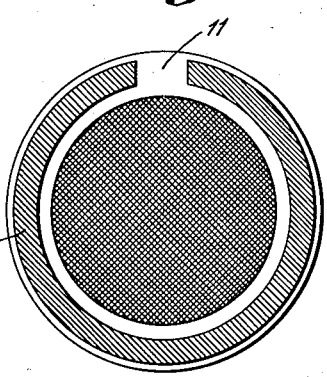
*Fig. 6*
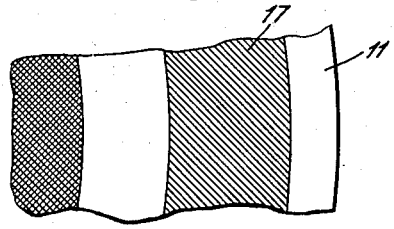
*Fig. 7*
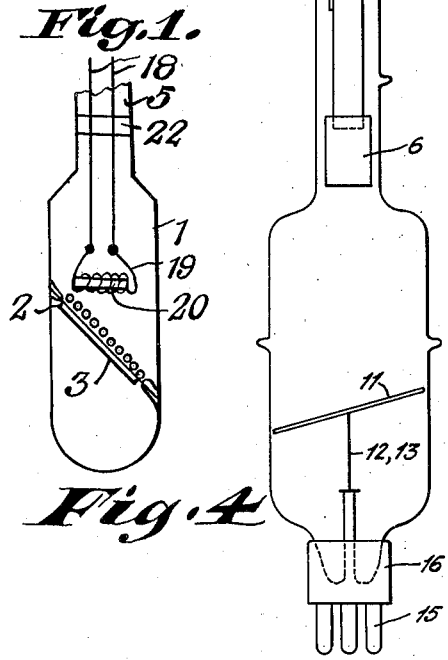
*Fig. 1.*   *Fig. 4*
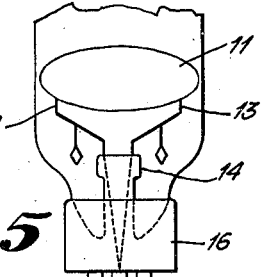
*Fig. 5*
INVENTOR
W. F. TEDHAM
J. D. MC GEE
BY
ATTORNEY Patented Apr. 20, 1937

2,077,442

UNITED STATES PATENT OFFICE 2,077,442

CATHODE RAY TUBE

William F. Tedham and James D. McGee, London, England, assignors to Electric & Musical Industries Limited, a company of Great Britain Application August 9, 1933, Serial No. 684,296
In Great Britain August 25, 1932

9 Claims. (Cl. 250—27.5)

The present invention relates to cathode ray tubes and the like such as may be used, for example, for purposes of television.

Television systems are already known in which, at a transmitting station, scanning is effected with the aid of a cathode ray tube. In such systems an image of the object to be transmitted is optically projected upon a photo-electrically active electrode of a cathode ray tube, the electrode being scanned by the cathode beam. The electrode may consist of a glass sheet coated on one side with a uniformly conductive material and on the other side with a "mosaic" of small, insulated, elemental areas of oxidized silver having a coating of photoelectric material such as caesium.

Picture impulses may then be developed across a high resistance inserted in the external circuit between the uniformly conductive surface of the "mosaic electrode" and the cathode of the tube.

A method of preparing the mosaic type of electrode has been proposed in which a base for a photoelectric material is deposited upon a glass plate and then ruled mechanically into separate areas. This method has the advantage that a very regular mosaic surface is obtained but has the disadvantage that, since the ruling operation cannot be performed whilst the mosaic electrode is mounted within the cathode ray tube, damage to the surface, due to overheating, generally ensues whilst the mosaic electrode is being sealed into the tube.

It has also been proposed to prepare a mosaic electrode by dusting a base for a photoelectric material such as a silver salt for example, on to the electrode and then heating the silver salt in order to cause it to agglomerate into small, separate, globular particles. Here again the dusting process cannot easily be carried out whilst the mosaic electrode is within the tube and thus damage to the surface during the sealing-in process is again possible.

The preparation of a mosaic electrode by the use of a reduced photographic image upon a Schumann plate suffers from the same disadvantage.

It is an object of the present invention to provide a method of preparing a mosaic electrode, of the type described above in which the preparation of the photoelectric surface may be carried out after the electrode has been sealed within the cathode ray tube.

According to the present invention a method of coating an electrode of a cathode ray tube or the like with a plurality of insulated elements of photoelectric material comprises the step of depositing a substance upon the electrode through a screen such as wire mesh, for example.

Preferably the deposition is carried out whilst the electrode is mounted within the cathode ray tube, and the screen subsequently removed.

An example of the invention will now be described, reference being made to the accompanying diagrammatic drawing, in which:

Fig. 1 shows a cathode ray tube and illustrates a method of coating the mosaic support with a metallic substance in accordance with the present invention;

Fig. 1a shows a cathode ray tube and illustrates a method of forming a mosaic electrode in accordance with the present invention;

Fig. 2 illustrates, in greater detail, the mosaic electrode illustrated by Fig. 1;

Fig. 3 illustrates a circuit arrangement for amplifying electrical impulses generated at the mosaic electrode;

Figs. 4 and 5 are views in front and side elevation of a cathode ray tube having a mosaic electrode constructed in accordance with the present invention;

Fig. 6 shows the mosaic screen with a ring of photoelectric material used for test purposes; and Fig. 7 shows an enlargement of a portion of Fig. 6.

Referring now to Figs. 1, 1a and 2, one end of a soda-glass or hard boro-silicate glass tube 1 of circular cross-section is blown to a size suitable for accommodating a mosaic electrode upon which optical images of the object are to be projected and into this end there is sealed, at an angle of about 45° to the axis of the tube, a glass disk 2 coated uniformly on one side with a layer of electrically conductive material 3. The uniformly coated side of the glass disk 2 is near to the closed end of the tube. On the other side of the glass disk 2 there is lightly clipped a screen 4 of very fine wire mesh of, say, three hundred lines to the inch.

The glass tube thus consists of a larger end, containing the glass disk 2, and a narrower open end 5.

Into the narrower end 5 of the tube there are then sealed, or passed through an air-tight bung 22, two wires 18 carrying at their ends a helix of tungsten wire 19 within which is a pellet of silver 20.

The tube is then evacuated as highly as possible whilst an electric current is passed through the wire leads 18 and tungsten spiral 19 in order to heat up and vaporize the pellet of silver 20. In order to prevent the mosaic pattern from being partially destroyed by reflection of the distilled silver either from the walls of the tube or from the glass disk itself, the outside of the tube may be maintained at a very low temperature during the deposition of the silver. This is conveniently achieved by wrapping the tube in cotton wool and pouring on to the wool a small quantity of liquid air. It has been found that this cooling process is effective in preventing reflection of the silver from the walls of a boro-silicate glass tube but is generally unnecesary in the case of a soda-glass tube.

The process of evaporation in vacuo and distillation may be carried out slowly in order to ensure that the silver deposits uniformly over the wire screen 4 and glass disk 2, whilst as much as possible of the walls of the tube are screened.

It will be readily seen that the deposit upon the glass disk 2 is in the form of small, separate squares (as shown in Figs. 2 and 6), corresponding to the shadow image of the wire screen 4.

After a sufficient deposition of silver has been effected, the tungsten spiral 19, the wire leads 18 and the wire screen are removed from the tube; the screen may be removed, if necessary, by gripping it with a pair of long pincers.

The remaining electrodes of the tube, one of which is indicated at 6, are then sealed into the narrower end of the tube and a small side tube 2 containing a mixture of calcium turnings and caesium bromide powder is sealed into the tube at a point between these remaining electrodes and the glass disk 2.

The tube is then evacuated as highly as possible whilst being baked in order to drive off gases occluded in the walls of the tube. Oxygen is then admitted up to a pressure of about 0.3 millimetre of mercury and a high frequency discharge passed between the glass disk 2 and one of the other electrodes, such as the electrode 6, in order to oxidize the silver mosaic.

On completion of the oxidizing process, excess oxygen is pumped out. Caesium is then distilled upon the oxidized silver mosaic by heating the side tube 21. The process of distilling the caesium is carried out in a series of stages, the tube being baked in between each stage of distillation.

It will be seen that since, after the first deposition of silver in the form of a mosaic, all sealing and heating operations are carried out at places comparatively remote from the mosaic surface, no damage to this surface need be entailed as a result of these operations.

The caesium which is deposited directly upon the glass disk in the interstices between the oxidized silver elements reacts with the oxide layer during the baking processes and is thus largely removed from these interstices.

In order to use the tube at a transmitting station for scanning purposes an optical image of the object to be transmitted is projected upon the photoelectric surface of the mosaic electrode by means of a lens 7 and the glass disk 2 is scanned at constant speed by the cathode ray. Deflection of the ray so as to scan the mosaic screen may be effected by means of deflecting coils or plates which if desired may be sealed within the tube.

In between successive scans of any one insulated element, the element acquires a certain definite potential owing to the loss of electrons emitted photoelectrically. If no light falls upon the element from the object then no electrons are emitted and the potential between scans remains unchanged. If, on the other hand, an intense light falls upon the element from the object then many electrons are emitted and the element acquires a comparatively large positive potential. Each insulated element forms, with the uniformly conductive coating 3 on the reverse side of the glass disk 2, a small condenser and the charge on each of these small condensers is brought to a predetermined value when struck by the cathode ray. The action of the ray on the individual condensers occurs almost instantaneously. The potential of the element remains constant at the predetermined value until the scanning ray moves off the element. The element then begins once again to lose electrons photoelectrically until the scanning ray reaches the element again.

Thus each time the scanning ray strikes an element the potential of that element is changed from some value determined by the number of electrons emitted photoelectrically since the last scan, to a fixed value which is the same for all elements. The potential of the uniform coating 3 on the reverse side of the disk 2 varies correspondingly.

The changes in potential of the coating 3 may be utilized in any known or suitable manner to derive picture signals suitable for transmission.

In one arrangement, illustrated in Fig. 3, the conducting layer 3 is connected to earth through a resistance 8 and the end of the resistance 8 nearer the layer 3 is connected, through a condenser 9, to the grid of a thermionic valve 10. The filament of the valve 10 is connected to earth. Variations in potential across the resistance 8 give rise to amplified electric impulses in the plate circuit of the valve 10 and these are transmitted, if necessary after further amplification, in any known or suitable manner.

It will be seen that the arrangement is most efficient when the capacities of the individual condensers formed by the photoelectric elements and the coating 3 are large compared to the grid-filament capacity of the valve 10. Some difficulty has been found in making the capacities of the small condensers sufficiently high when using glass as dielectric, because if the glass be made thinner than about 0.01 inch the electrode becomes extremely fragile.

In the following example of the invention, which is illustrated in Figs. 4, 5, 6 and 7, the photoelectric elements are deposited upon a coating of oxide on a metal plate. The dielectric of the small condensers is thus constituted by the oxide coating and since this coating can be made very thin the capacity of the condensers can be made very high, considerably higher, in fact, than when glass is used as dielectric.

The base for the photoelectric elements comprises in this example an aluminium disk 11 which has at least one of its faces oxidized. The oxidation may be effected by making the disk the anode in an electrolytic cell containing chromic acid for a time sufficient to give an oxide coating of about .002 inch.

The oxidized disk 11 is mounted in the larger end of a soda-glass or hard boro-silicate glass tube at an angle of about 75° to the axis of the tube. The disk is supported upon arms 12 and 13 which are held in a press or pinch 14 and both of which are connected to a pin 15 of the base 16. The tube is sealed into the base.

The process of coating of the disk of oxidized aluminium with photoelectric elements may be carried out as described previously; silver is vaporized upon the oxide layer through a wire mesh screen, the screen is removed, the silver is oxidized and photoelectric material such as caesium is then deposited upon the silver oxide. In addition an annular ring 17 (see Fig. 6) of photoelectric material upon silver oxide is deposited upon the disk 11. The annular ring is prepared in exactly the same way as the mosaic elements and is used solely for testing the sensitivity of the photoelectric material prior to using the tube in its normal way. Connection to the ring 17 is made by way of one of the pins of the holder 16.

If desired the elements may be circular in shape in which case the deposition of silver is effected through a plate having circular holes punched in it at appropriate intervals.

Each element of the mosaic forms a condenser with the body of the aluminium disk, the oxide coating on the disk forming the dielectric of the condenser.

The operation of the tube is exactly the same as before. In between successive scans each condenser acquires a charge depending upon the intensity of the light falling upon the element from the object and at each scan the charge on each condenser is changed to a value which is the same for all the condensers. The potential of the disk 11 thus varies in accordance with the light and shade values of successive elements of the object.

The variations in potential of the disk 11 may be utilized as described above in order to generate picture signals suitable for transmission.

It will be apparent that the method of forming the mosaic electrode may be used in any case in which it is desired to deposit small insulated elements of photoelectric material upon the electrode whether the electrode is intended for use in a cathode ray tube or in some other device such as a photoelectric device.

We claim:

1. A method of preparing a light sensitive electrode for use in a cathode ray tube having a plurality of elements of photoelectric material insulated from one another which comprises the steps of depositing a metallic substance upon the electrode through a mesh-like screen, then oxidizing the deposited material, and subsequently photosensitizing the oxidized substance.

2. The method as claimed in claim 1 wherein the metallic substance is evaporated in vacuo and condensed upon the supporting electrode.

3. The method as claimed in claim 1, and then removing the mesh-like screen after the deposition of substance through the screen.

4. The method of preparing a light sensitive electrode for use in a cathode ray scanning device which comprises the steps of positioning a mesh-like pattern grid adjacent an insulating support member, directing metal particles through the mesh to cause the particles to adhere to the support in isolated manner according to the pattern of openings in the mesh, oxidizing the deposited particles, coating each oxidized isolated particle with a light sensitive substance, sensitizing the material and subsequently removing the mesh-like pattern grid from its position adjacent the support member.

5. The method of preparing a light sensitive electrode comprising the steps of positioning a metallic support member within an envelope, oxidizing the entire area of one surface of the support member, coating the oxidized surface with isolated discrete metallic particles, oxidizing said particles, and subsequently photo-sensitizing said oxidized particles.

6. The method of preparing a light sensitive electrode comprising the steps of positioning a metallic support member within an envelope, oxidizing the entire area of one surface of the support member, coating only portions of the said oxidized surface with isolated discrete metallic particles according to a predetermined pattern, oxidizing said particles, and subsequently photo-sensitizing said oxidized particles.

7. The method of preparing a light sensitive electrode comprising the steps of positioning a metallic support member within an envelope, oxidizing the entire area of one surface of the support member, coating the said oxidized surface with isolated discrete metallic particles while masking predetermined areas of said oxidized surface, oxidizing said particles, and subsequently photo-sensitizing said particles.

8. The method of preparing a light sensitive electrode comprising the steps of positioning an insulating support member within an envelope, coating one surface of said support member with isolated discrete metallic particles according to a predetermined pattern, oxidizing said particles, and subsequently photo-sensitizing said oxidized particles.

9. The method of preparing a light sensitive electrode comprising the steps of positioning an insulating support member within an envelope unit, coating one surface of said support member with isolated discrete metallic particles while masking predetermined areas of said support member, oxidizing said particles, and subsequently photo-sensitizing said oxidized particles.

WILLIAM F. TEDHAM.
JAMES D. McGEE.